US012785010B2

(12) United States Patent
Wang

(10) Patent No.: US 12,785,010 B2
(45) Date of Patent: Nov. 3, 2026

(54) DOUBLE-SHEET-METAL STRUCTURE FOR SWITCHES

(71) Applicant: Cixi Minghe Xinghua Electrical Appliance Co., Ltd, Ningbo (CN)

(72) Inventor: Jianping Wang, Ningbo (CN)

(73) Assignee: Cixi Minghe Xinghua Electrical Appliance Co., Ltd, Ningbo (CN)

( * ) Notice: Subject to any disclaimer, the term of this patent is extended or adjusted under 35 U.S.C. 154(b) by 303 days.

(21) Appl. No.: 18/643,960

(22) Filed: Apr. 23, 2024

(65) Prior Publication Data

US 2025/0226163 A1 Jul. 10, 2025

(30) Foreign Application Priority Data

Jan. 9, 2024 (CN) ........................ 202410031001.6

(51) Int. Cl.
*H01H 13/702* (2006.01)
*H01H 13/14* (2006.01)
*H01H 13/26* (2006.01)

(52) U.S. Cl.
CPC .......... *H01H 13/702* (2013.01); *H01H 13/14* (2013.01); *H01H 13/26* (2013.01)

(58) Field of Classification Search
CPC ...... H01H 13/702; H01H 13/14; H01H 13/26; H01H 73/26; H01H 37/52; H01H 37/04; H01H 13/36; H01H 5/18; H01H 37/60; H01H 37/54; H01H 13/38; H01H 5/30; H01H 2037/5463; H01H 37/50; H01H 37/5418
See application file for complete search history.

(56) References Cited

U.S. PATENT DOCUMENTS 7,059,035 B2 * 6/2006 Davis ..................... H01H 37/54 267/159
10,796,872 B1 * 10/2020 Huang ................... H01H 77/04

FOREIGN PATENT DOCUMENTS

| | | | | | |
|---|---|---|---|---|---|
| CN | 202142472 | U | | 2/2012 | |
| CN | 103198975 | A | | 7/2013 | |
| CN | 204105771 | U | | 1/2015 | |
| CN | 214123745 | U | * | 9/2021 | |
| CN | 114141588 | A | * | 3/2022 | ............. H01H 13/12 |
| WO | WO-2005041237 | A1 | * | 5/2005 | ........... H01H 37/764 |

* cited by examiner

*Primary Examiner* — Ahmed M Saeed
(74) *Attorney, Agent, or Firm* — George D. Morgan

(57) ABSTRACT

A double-sheet-metal structure for switches is disclosed, belonging to the technical field of switching equipment. The double-sheet-metal structure for switches includes a base, a main body and a fixed bracket. The present invention solves the problems of excessive deformation of the double sheet metal after a long time and difficulty in restoring the original state, achieving higher radian height of overall deformation of the double sheet metal and higher stability of current of the double sheet metal, and then realizing more excellent overall performance and more convenient operation.

9 Claims, 7 Drawing Sheets

DOUBLE-SHEET-METAL STRUCTURE FOR SWITCHES

CROSS-REFERENCE TO RELATED APPLICATIONS

The application claims priority to Chinese patent application No. 202410031001.6, filed on Jan. 17, 2024, the entire contents of which are incorporated herein by reference.

TECHNICAL FIELD

The present invention relates to the technical field of switching equipment, in particular to a double-sheet-metal structure for switches.

BACKGROUND

Double-sheet-metal switch is a switch opened and closed by utilizing a thermal effect of double sheet metal. Its main operating principle is to promote the opening and closing action of the switch by utilizing the change of mechanical properties of double sheet metal in the case of change in temperature. When the temperature rises, a high thermal expansion coefficient part of the double sheet metal bends outward, to drive a contact to open and close. When the temperature falls, the high thermal expansion coefficient part of the double sheet metal bends inward to restore its original state, so that the switch is closed again. The double-sheet-metal switch is widely applied to the temperature control, circuit protection and other fields.

Based on the above, the inventors find that, for the existing double-sheet-metal structure of switch, when the temperature rises, the high thermal expansion coefficient part of the double sheet metal bends outward, to drive the contact to open and close; when the temperature falls, the high thermal expansion coefficient part of the double sheet metal bends inward, so that the switch is closed again; however, if the double sheet metal is used for a long time, it may be deformed excessively and then fail to restore the original state rapidly, thereby causing the failure of an internal circuit of the switch, and further affecting the normal use of the switch. Therefore, in view of this, the existing structure is studied and improved; and a double-sheet-metal structure for switches is provided to achieve the purpose of higher practical value.

SUMMARY

1. Technical problems to be solved

On account of the problems in the prior art, a purpose of the present invention is to provide a double-sheet-metal structure for switches, which can support the deformed bottom of double sheet metal with a reset fulcrum and then press the top of one end of the double sheet metal downward with two reset rods, so that the overall stress of the double sheet metal is removed under the action of an added inner groove, a first sheet metal and a second sheet metal can flip up and down more freely, the first sheet metal can flip to drive the second sheet metal to flip, and a double sheet metal contact on the second sheet metal can be contacted and disconnected with a dynamic terminal contact, thereby realizing the rapid reset of the double sheet metal and the rapid connection and disconnection of the internal circuit, solving the problems of excessive deformation of the double sheet metal after a long time and difficulty in restoring the original state, achieving higher radian height of overall deformation of the double sheet metal and higher stability of current of the double sheet metal, and then realizing more excellent overall performance and more convenient operation.

2. Technical scheme

To solve the above problems, the following technical scheme is adopted in the present invention.

A double-sheet-metal structure for switches comprises a base, a main body and a fixed bracket, wherein the main body is fixedly mounted inside the base; tops of two ends of the main body are fixedly connected with guide columns; two ends of the fixed bracket are movably sleeved on the periphery of the guide columns; two ends of an inner wall at the bottom of the base are respectively clamped with a static terminal and a dynamic terminal; double sheet metal is fixedly mounted at the top of the static terminal; the top of one end of the main body is fixedly connected with a zero terminal through an elastic buckle; the bottom of one end of the main body is fixedly connected with a connecting column; a bottom end of the connecting column is in contact with a surface of the static terminal; an LED lamp is fixedly mounted at the bottom of the fixed bracket; a first spring and a second spring are respectively arranged between the bottoms of both ends of the LED lamp and the dynamic terminal and the zero terminal; a pressing mechanism is arranged between a middle position of a bottom surface of the LED lamp and the dynamic terminal; the fixed bracket is fixedly connected with reset rods at both sides of the first spring; and the reset rods penetrate through the main body.

The double sheet metal comprises a first sheet metal fixedly connected with the top of the static terminal; a second sheet metal is fixedly connected with the middle position of the first sheet metal; a double sheet metal contact is fixedly connected with the end of the second sheet metal; and a concave arc groove is formed in one end of the first sheet metal.

An inner wall of the bottom of the base is fixedly connected with a reset fulcrum; and the reset fulcrum is located below one end of the first sheet metal.

Further, the dynamic terminal is an integral structure composed of a wiring section, a bending section and a contact section; the wiring section is clamped on the inner wall of the bottom of the base; and the contact section is located above the wiring section and connected through the bending section.

Further, the pressing mechanism comprises an upper gear fixed at the bottom of the LED lamp; a lower gear is slidably connected with the bottom of the upper gear; and a pressing spring is arranged between the bottom of the lower gear and the top of one end of the contact section.

Further, the bottom of one end of the contact section is riveted with a dynamic terminal contact; the dynamic terminal contact is located right above the double sheet metal contact; and a bump is fixedly mounted at the top of the other end of the contact section.

Further, a top end of the dynamic terminal contact extends to the top of the contact section and is clamped with a bottom end of the pressing spring.

Further, the top of the bump is clamped with the bottom end of the first spring.

Further, a button is fixedly mounted at the top of the fixed bracket.

Further, a locking piece is integrally molded at the top of the main body; and the bottom end of the lower gear is movably arranged inside the locking piece.

Further, one side of the top ends of the two guide columns far away from each other is fixedly connected with limiting blocks; and the bottoms of the limiting blocks are in movable contact with the top surface of the fixed bracket.

3. Beneficial effects

Compared with the prior art, the present invention has the advantages that:

In the scheme, the bottom of deformed double sheet metal is supported by the reset fulcrum; then, the top of one end of the double sheet metal is pressed down with two reset rods while pressing the button; at the same time, the stress at one end of the first double sheet metal can be removed under the action of the added concave arc groove, while the second sheet metal can drive the double sheet metal contact to flip up, so that the double sheet metal contact can be in contact with the dynamic terminal contact, thereby realizing the rapid reset of the double sheet metal and the rapid connection of the internal circuit, solving the problems of excessive deformation of the double sheet metal after a long time and difficulty in restoring the original state, and improving the use convenience.

Figure 1:
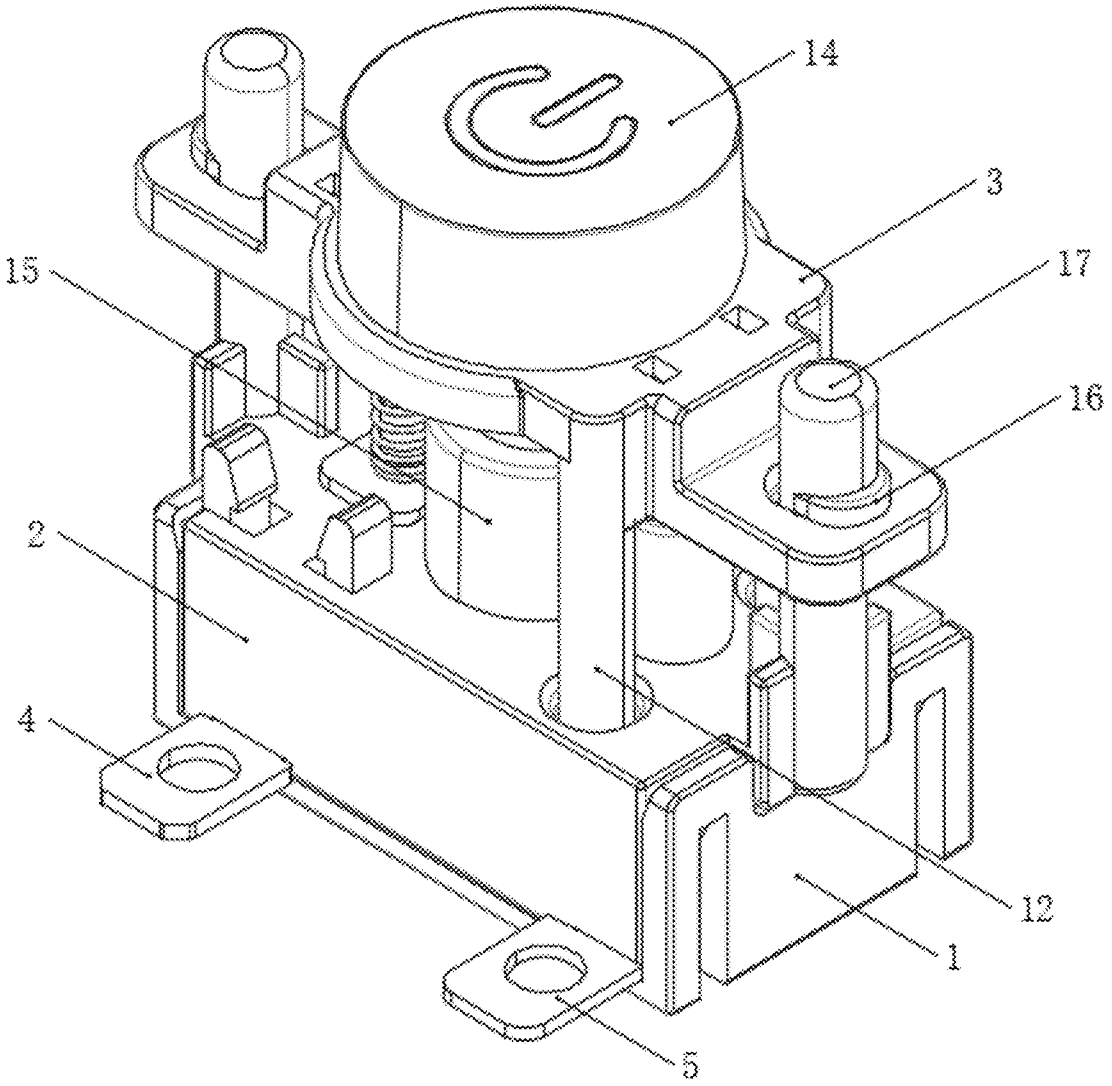
FIG. 1 is a schematic diagram of an overall structure according to the present invention.

1. base;
2. main body;
3. fixed bracket;
4. static terminal;
5. dynamic terminal; 51. wiring section; 52. bending section; 53. contact section; 54. dynamic terminal contact; 55. bump;
6. double sheet metal; 61. first sheet metal; 62. second sheet metal; 63. double sheet metal contact; 64. concave arc groove;
7. zero terminal;
8. LED lamp;
9. first spring;
10. second spring;
11. pressing mechanism; 1101. upper gear; 1102. lower gear; 1103. pressing spring;
12. reset rod;
13. reset fulcrum;
14. button;
15. locking piece;
16. limiting block;
17. guide column
18. connecting column.

DETAILED DESCRIPTION OF THE EMBODIMENTS

Technical schemes in embodiments of the present invention will be described clearly and completely below in combination with the accompanying drawings. Apparently, the described embodiments are only part of embodiments of the present invention, but not all the embodiments. All other embodiments obtained by those of ordinary skill in the art based on embodiments in the present invention without creative work should fall within the protection scope of the present invention.

EMBODIMENT

Referring to FIGS. 1-7, a double-sheet-metal structure for switches comprises a base 1, a main body 2 and a fixed bracket 3, wherein the main body 2 is fixedly mounted inside the base 1; tops of two ends of the main body 2 are fixedly connected with guide columns 17; two ends of the fixed bracket 3 are movably sleeved on the periphery of the guide columns 17; two ends of an inner wall at the bottom of the base 1 are respectively clamped with a static terminal 4 and a dynamic terminal 5; double sheet metal 6 is fixedly mounted at the top of the static terminal 4; the top of one end of the main body 2 is fixedly connected with a zero terminal 7 through an elastic buckle; the bottom of one end of the main body 2 is fixedly connected with a connecting column 18; a bottom end of the connecting column 18 is in contact with a surface of the static terminal 4; an LED lamp 8 is fixedly mounted at the bottom of the fixed bracket 3; a first spring 9 and a second spring 10 are respectively arranged between the bottoms of both ends of the LED lamp 8 and the dynamic terminal 5 and the zero terminal 7; a pressing mechanism 11 is arranged between a middle position of a bottom surface of the LED lamp 8 and the dynamic terminal 5; the fixed bracket 3 is fixedly connected with reset rods 12 at both sides of the first spring 9; and the reset rods 12 penetrate through the main body 2.

The double sheet metal 6 comprises a first sheet metal 61 fixedly connected with the top of the static terminal 4; a second sheet metal 62 is fixedly connected with the middle position of the first sheet metal 61; a double sheet metal contact 63 is fixedly connected with the end of the second sheet metal 62; and a concave arc groove 64 is formed in one end of the first sheet metal 61. During use, the concave arc groove 64 is provided, so that the stress generated when two reset rods 12 press down one end of the first sheet metal 61 can be removed, thereby avoiding serious deformation of two sides of one end of the first sheet metal 61.

A reset fulcrum 13 is fixedly connected with the inner wall of the bottom of the base 1; and the reset fulcrum 13 is located below one end of the first sheet metal 61. During use, the reset fulcrum 13 is provided, so that the bottom of the reset rod 12 can be supported in the process that the reset rod 12 presses down the first sheet metal 61, the second sheet metal 62 can drive the double sheet metal contact 63 to flip up and be in contact with the dynamic terminal 5, and the second sheet metal 62 will flip down in the case of overload, thereby realizing rapid reset of the double sheet metal 6 after excessive deformation, achieving better contact with the dynamic terminal 5, and ensuring the normal use of the switch.

Figure 6:
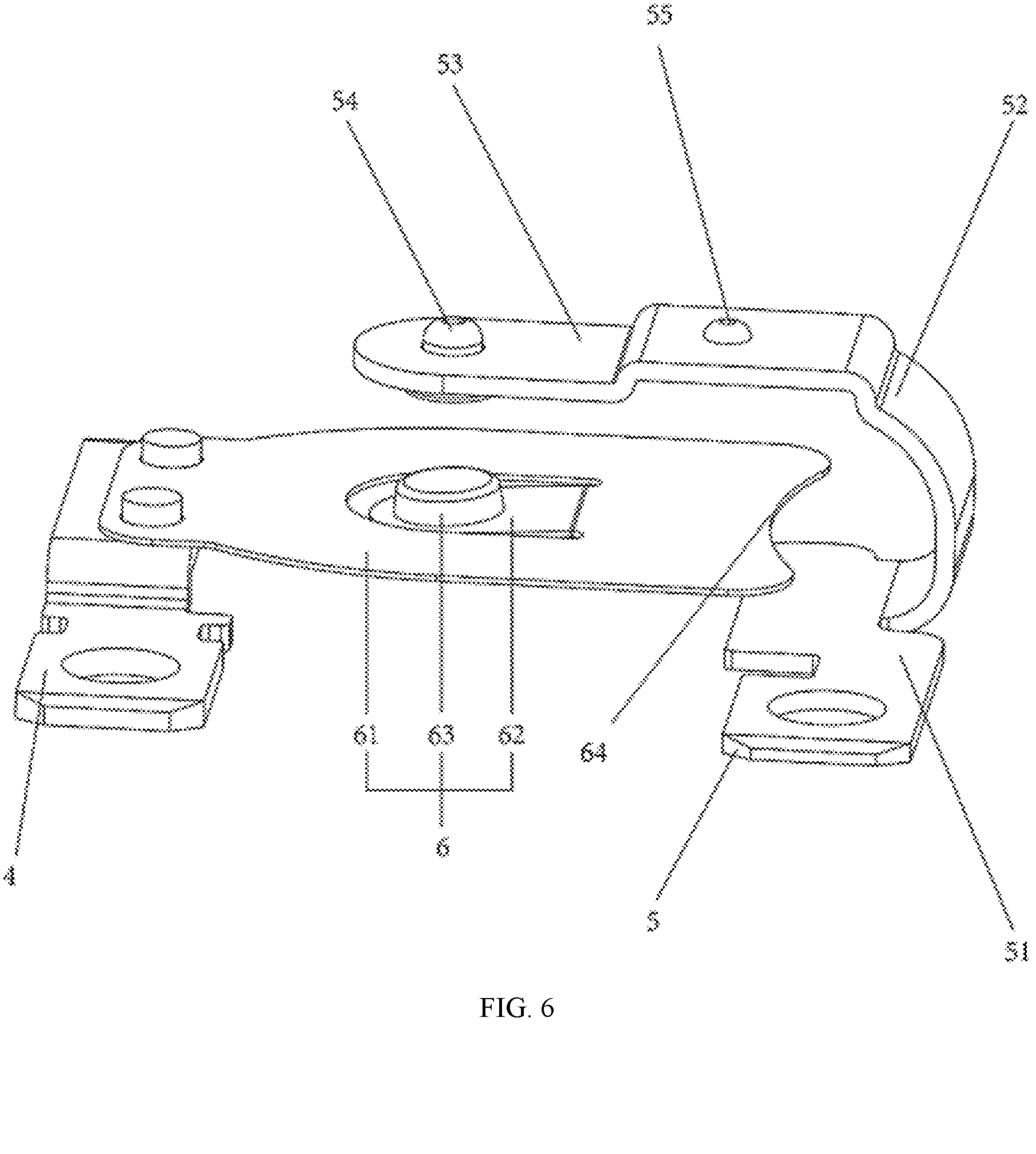
FIG. 6 is a schematic diagram of a position structure of a dynamic terminal according to the present invention.
Figure 7:
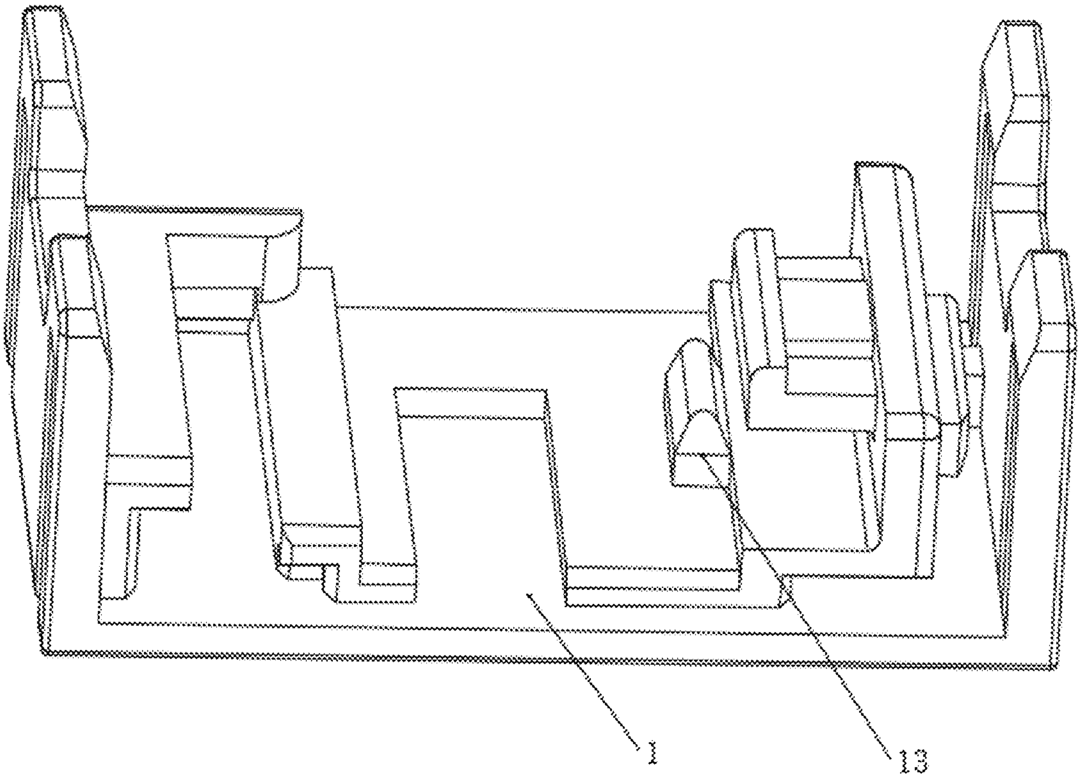
FIG. 7 is a schematic diagram of a position structure of a base according to the present invention.

Referring to FIG. 6, the dynamic terminal 5 is an integral structure composed of a wiring section 51, a bending section 52 and a contact section 53; the wiring section 51 is clamped on the inner wall of the bottom of the base 1; and the contact section 53 is located above the wiring section 51 and connected through the bending section 52. During use, an open slot is formed at a wiring port on the wiring section 51; and the open slot is added to better pass a high voltage test for the switch.

Figure 5:
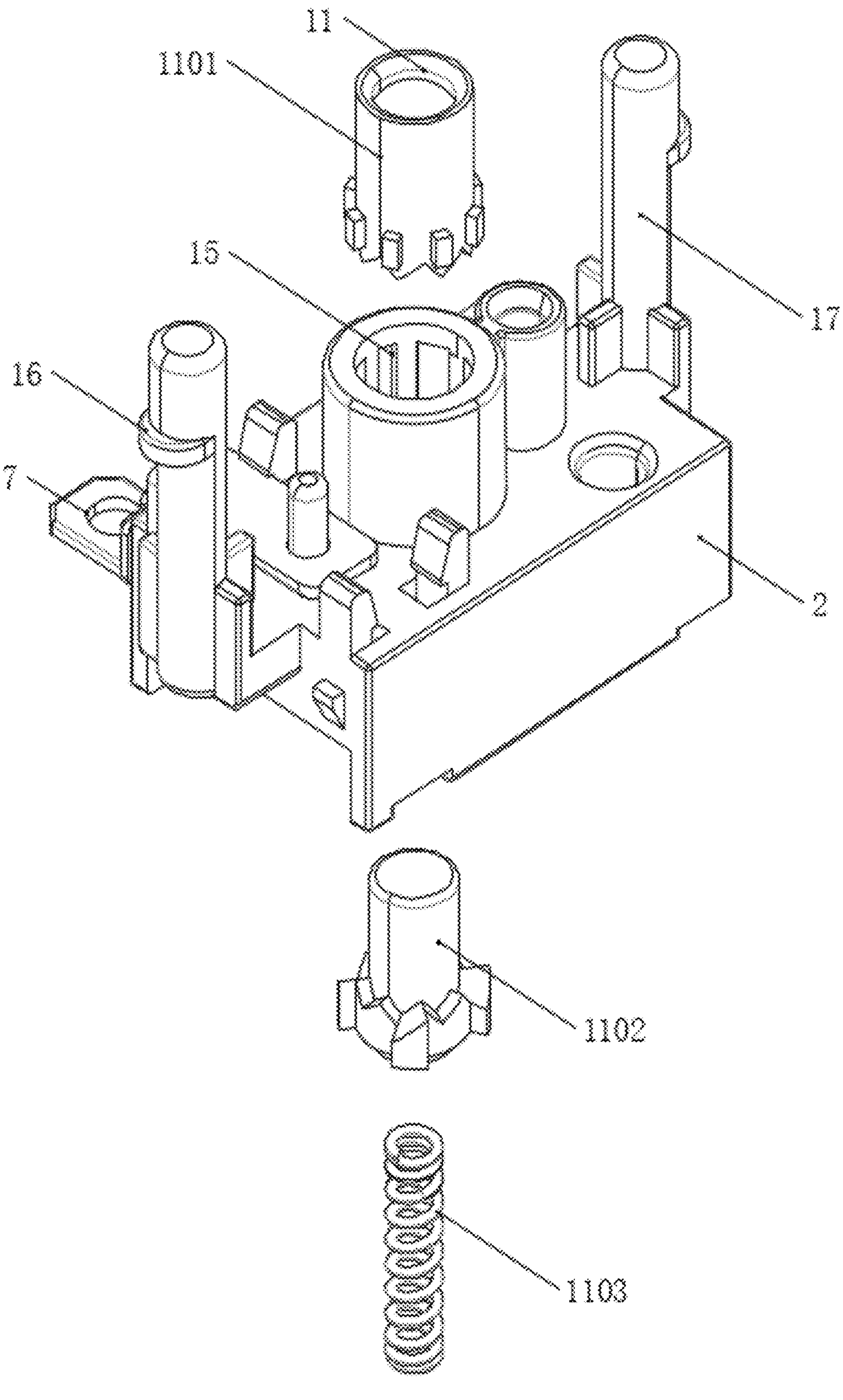
FIG. 5 is a structural diagram of a partial structure according to the present invention.

Referring to FIG. 5, the pressing mechanism 11 comprises an upper gear 1101 fixed at the bottom of the LED lamp 8; a lower gear 1102 is slidably connected with the bottom of the upper gear 1101; a pressing spring 1103 is arranged between the bottom of the lower gear 1102 and the top of one end of the contact section 53; a locking piece 15 is integrally molded at the top of the main body 2; and the bottom of the lower gear 1102 is movably arranged inside the locking piece 15. During use, irregular notches are evenly distributed on the inner wall of the locking piece 15, and the bottom of the upper gear 1101 is provided with evenly distributed serrations, so that when the lower gear 1102 is pressed down, it will drive the lower gear 1102 to rotate downward, and the lower gear 1102 will slide into the locking piece 15 under the resilience force of the pressing spring 1103 and be clamped with the relatively shallow notches, and the dynamic terminal contact 54 keeps in contact with the double sheet metal contact 63, thereby realizing the closing of the internal circuit of the switch. When the upper gear 1101 is pressed down again, similarly, the lower gear 1102 will slide into the locking piece 15 under the resilience force of the pressing spring 1103 and be clamped with the relatively deep notches, so that the dynamic terminal contact 54 is separated from the double sheet metal contact 63, thereby realizing the disconnection of the circuit of the switch.

Referring to FIG. 6, a dynamic terminal contact 54 is riveted at the bottom of one end of the contact section 53; the dynamic terminal contact 54 is located right above the double sheet metal contact 63; and a bump 55 is fixedly mounted at the top of the other end of the contact section 53.

Figure 3:
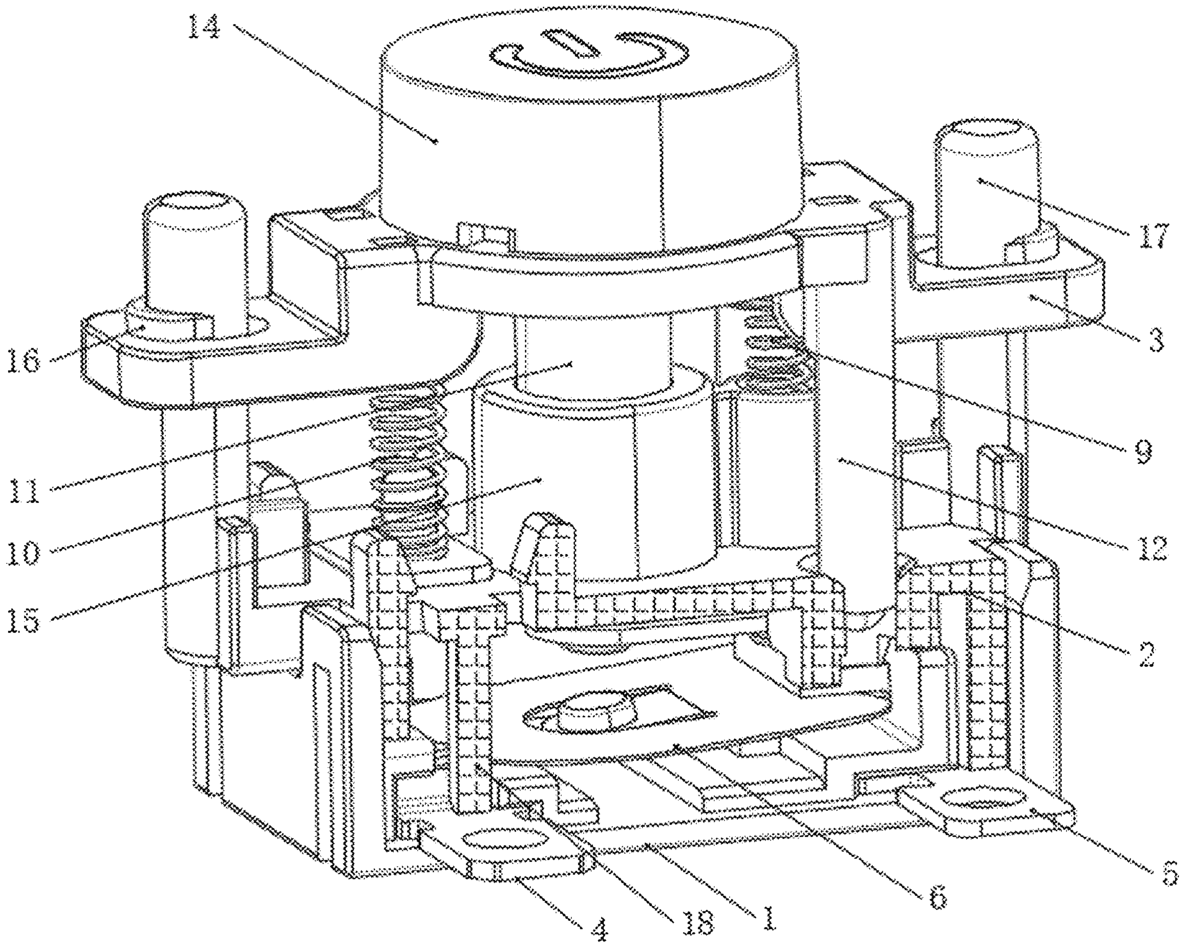
FIG. 3 is a schematic diagram of an internal structure according to the present invention.

Referring to FIGS. 3 and 6, the top end of the dynamic terminal contact 54 extends to the top of the contact section 53 and is clamped with the bottom end of the pressing spring 1103.

Figure 4:
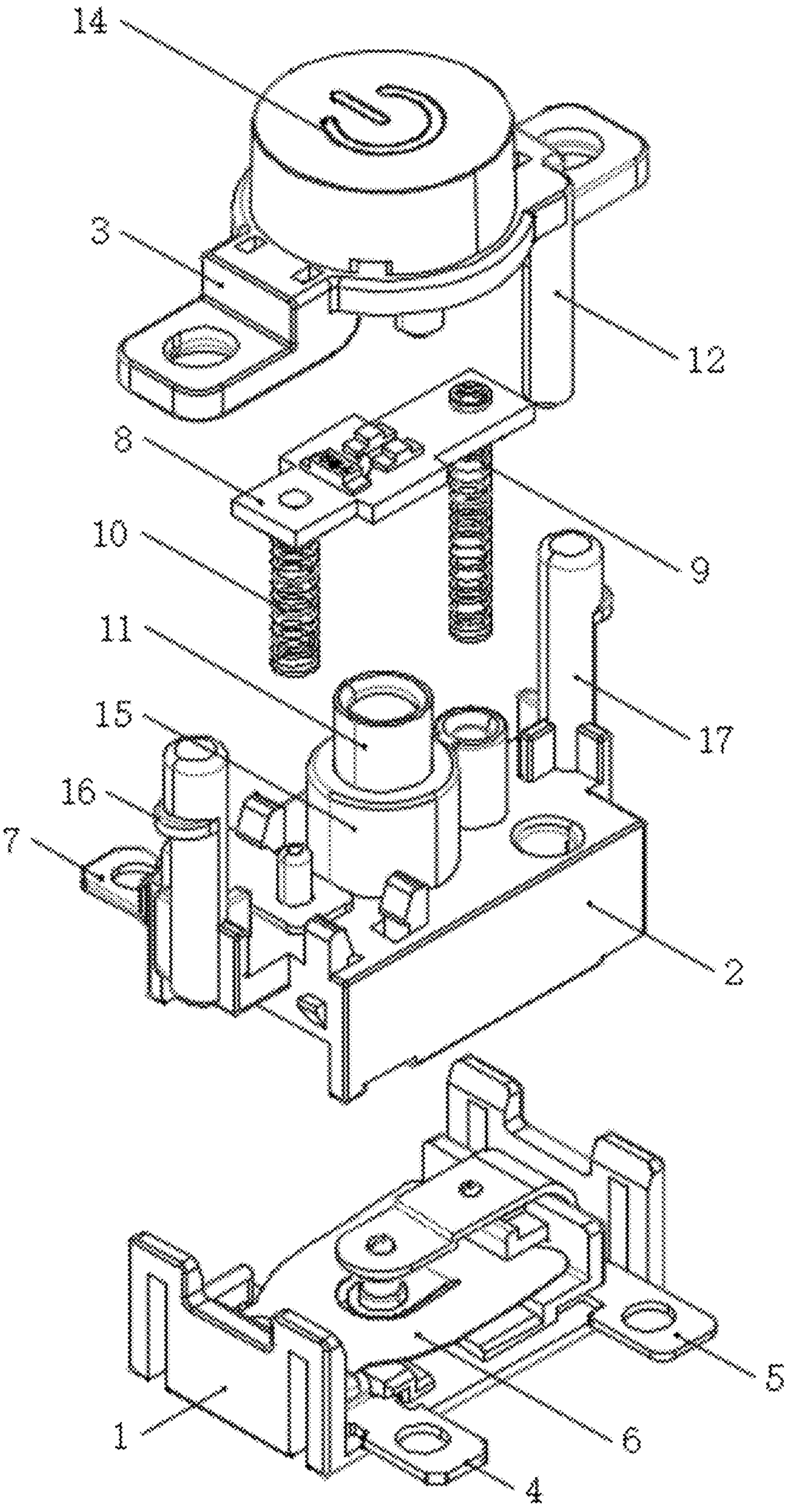
FIG. 4 is a schematic diagram of a splitting structure according to the present invention.

Referring to FIGS. 3, 4 and 6, the top of the bump 55 is clamped with the bottom end of the first spring 9.

Figure 2:
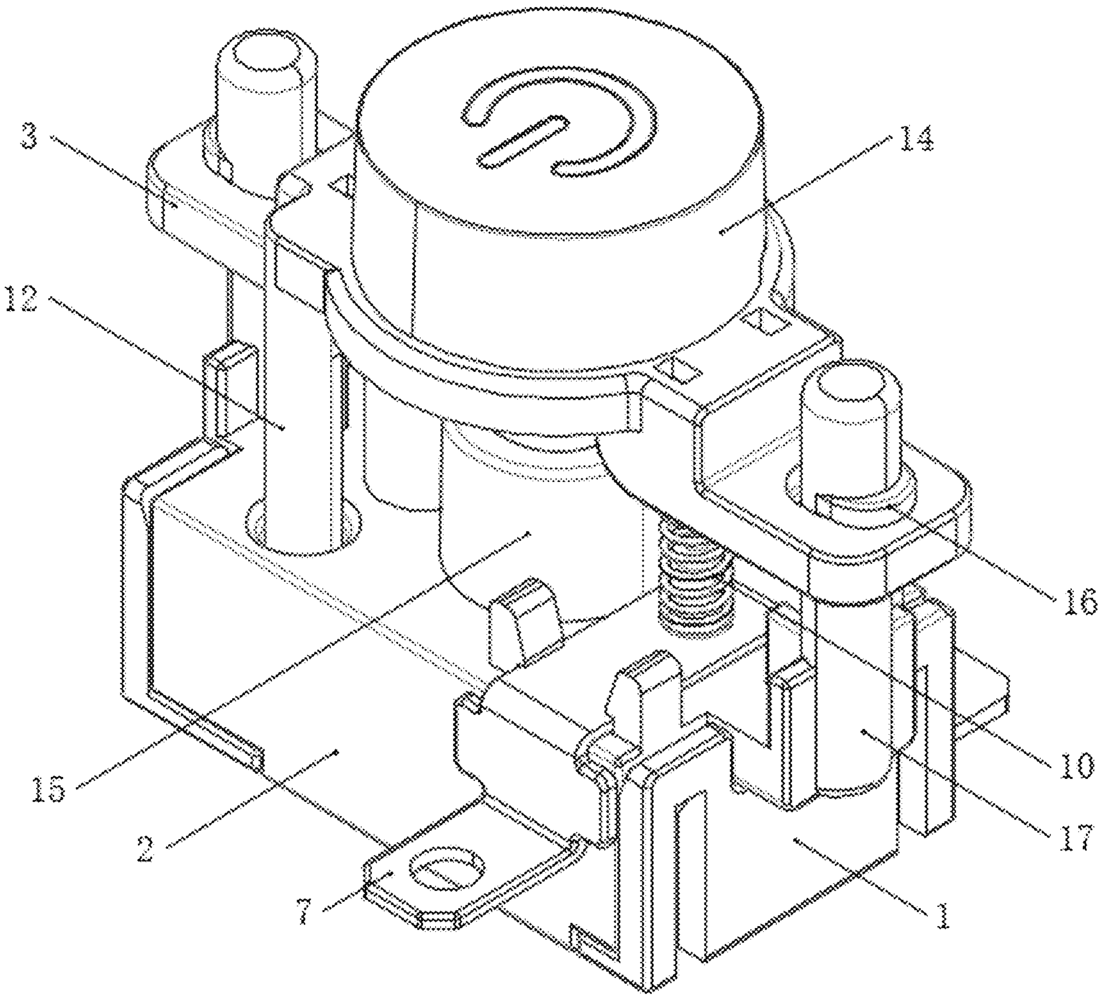
FIG. 2 is a schematic diagram of a back structure of FIG. 1 according to the present invention.

Referring to FIGS. 1, 2 and 3, a button 14 is fixedly mounted at the top of the fixed bracket 3.

Referring to FIGS. 1, 2 and 3, one side of the top ends of the two guide columns 17 far away from each other is fixedly connected with limiting blocks 16; and the bottoms of the limiting blocks 16 are in movable contact with the top surface of the fixed bracket 3.

During use, when the lower gear 1102 is pressed down, it will drive the lower gear 1102 to rotate downward; and the lower gear 1102 will slide into the locking piece 15 under the resilience force of the pressing spring 1103 and be clamped with the relatively shallow notches. The original state is that the first sheet metal 61 is flipped down, a tongue of the static terminal (5) of the second sheet metal is flipped up, and the double sheet metal contact 63 on the static terminal of the second sheet metal is connected with the dynamic terminal contact 54. When the current passes through the double sheet metal 6, and the heat is accumulated to a certain extent, the first sheet metal 61 flips up, the static terminal (5) of the second sheet metal flips down, and the double sheet metal contact 63 on the static terminal (5) of the second sheet metal is instantly disconnected from the dynamic terminal contact 54. After the double sheet metal 6 is cooled for a period of time, the button 14 is pressed down again, and the two reset rods 12 on the fixed bracket 3 also move downward, to press down two ends of a head of the static terminal (5) of the second sheet metal under the action of the reset fulcrum 13 and the concave arc groove 64, so that the first sheet metal 61 flips down to drive the double sheet metal contact 63 on the static terminal (5) of the second sheet metal to restore the original connection state and be connected with the dynamic terminal contact 54. The design solves the problems of excessive deformation of the double sheet metal 6 after a long time and difficulty in restoring the original state, achieves higher radian height of overall deformation of the double sheet metal 6 and higher stability of current of the double sheet metal 6, and then realizes more excellent overall performance and more convenient operation.

Finally, it should be noted that in the description of the present invention, it should be noted that the azimuth or positional relationship indicated by the terms "vertical", "upper", "lower" and "horizontal" is based on the azimuth or positional relationship shown in the accompanying drawings, and is only for the convenience of describing the present invention and simplifying the description, rather than indicating or implying that the device or element referred to must have a specific azimuth and be constructed and operated in a specific azimuth, so it cannot be understood as a limit to the present invention.

In the description of the present invention, it should also be noted that the terms "arrange", "mount", "interconnect" and "connect" should be broadly understood, for example, can refer to fixed connection, detachable connection or integral connection, can refer to mechanical connection or electrical connection, and can refer to direct connection, indirect connection through an intermediate medium, or internal communication of two elements. Those of ordinary skill in the art can understand specific meanings of the above terms in the present invention according to specific situations.

The above are only the preferred embodiments of the present invention, and not intended for limiting the protection scope of the present invention. Equivalent substitutions or changes made by those of ordinary skill in the art according to the technical schemes of the present invention and the improved concept thereof within the technical scope disclosed by the present invention should fall within the protection scope of the present invention.

What is claimed is:

1. A double-sheet-metal structure for switches, comprising a base (1), a main body (2) and a fixed bracket (3), wherein the main body (2) is fixedly mounted inside the base (1); tops of two ends of the main body (2) are fixedly connected with guide columns (17);

two ends of the fixed bracket (3) are movably sleeved on a periphery of the guide columns (17); two ends of an inner wall at a bottom of the base (1) are respectively clamped with a static terminal (4) and a dynamic terminal (5); a double sheet metal (6) is fixedly mounted at a top of the static terminal (4); a top of one end of the main body (2) is fixedly connected with a zero terminal (7) through an elastic buckle; a bottom of one end of the main body (2) is fixedly connected with a connecting column (18); a bottom end of the connecting column (18) is in contact with a surface of the static terminal (4); an LED lamp (8) is fixedly mounted at a bottom of the fixed bracket (3); a first spring (9) is disposed between one end of a bottom of the LED lamp (8) and the dynamic terminal (5), and a second spring (10) is disposed between another end of the bottom of the LED lamp (8) and the zero terminal (7); a pressing mechanism (11) is arranged between a middle position of a bottom surface of the LED lamp (8) and the dynamic terminal (5); the fixed bracket (3) is fixedly connected with reset rods (12) at both sides of the first spring (9); and the reset rods (12) penetrate through the main body (2);

the double sheet metal (6) comprises a first sheet metal (61) fixedly connected with the top of the static terminal (4); a second sheet metal (62) is fixedly connected with a middle position of the first sheet metal (61); a double sheet metal contact (63) is fixedly connected with a end of the second sheet metal (62); and a concave arc groove (64) is formed in one end of the first sheet metal (61);

an inner wall of the bottom of the base (1) is fixedly connected with a reset fulcrum (13); and the reset fulcrum (13) is located below one end of the first sheet metal (61).

2. The double-sheet-metal structure for switches according to claim 1, wherein the dynamic terminal (5) is an integral structure composed of a wiring section (51), a bending section (52) and a contact section (53); the wiring section (51) is clamped on the inner wall of the bottom of the base (1); and the contact section (53) is located above the wiring section (51) and connected through the bending section (52).

3. The double-sheet-metal structure for switches according to claim 1, wherein the pressing mechanism (11) comprises an upper gear (1101) fixed at the bottom of the LED lamp (8); a lower gear (1102) is slidably connected with a bottom of the upper gear (1101); and a pressing spring (1103) is arranged between a bottom of the lower gear (1102) and a top of one end of the contact section (53).

4. The double-sheet-metal structure for switches according to claim 2, wherein a bottom of one end of the contact section (53) is riveted with a dynamic terminal contact (54); the dynamic terminal contact (54) is located right above the double sheet metal contact (63); and a bump (55) is fixedly mounted at a top of another end of the contact section (53).

5. The double-sheet-metal structure for switches according to claim 4, wherein a top end of the dynamic terminal contact (54) extends to a top of the contact section (53) and is clamped with a bottom end of the pressing spring (1103).

6. The double-sheet-metal structure for switches according to claim 4, wherein a top of the bump (55) is clamped with a bottom end of the first spring (9).

7. The double-sheet-metal structure for switches according to claim 1, wherein a button (14) is fixedly mounted at a top of the fixed bracket (3).

8. The double-sheet-metal structure for switches according to claim 1, wherein a locking piece (15) is integrally molded at a top of the main body (2); and a bottom end of the lower gear (1102) is movably arranged inside the locking piece (15).

9. The double-sheet-metal structure for switches according to claim 1, wherein one side of top ends of two guide columns (17) far away from each other is fixedly connected with limiting blocks (16); and bottoms of the limiting blocks (16) are in movable contact with a top surface of the fixed bracket (3).

* * * * *